(12) United States Patent
Quackenbush et al.

(10) Patent No.: US 7,447,562 B2
(45) Date of Patent: Nov. 4, 2008

(54) BAGGAGE TRANSPORTATION SECURITY SYSTEM AND METHOD

(75) Inventors: Steve Quackenbush, Corona Del Mar, CA (US); William H. Montgomery, Cincinnati, OH (US); Brett C. Twitty, Norwalk, CA (US)

(73) Assignee: BTG Patent Holdings, LLC, Las Vegas, NV (US)

( * ) Notice: Subject to any disclaimer, the term of this patent is extended or adjusted under 35 U.S.C. 154(b) by 34 days.

(21) Appl. No.: 11/081,053

(22) Filed: Mar. 14, 2005

(65) Prior Publication Data

US 2005/0159838 A1   Jul. 21, 2005

Related U.S. Application Data

(63) Continuation-in-part of application No. 09/665,938, filed on Sep. 20, 2000, now Pat. No. 6,512,964.

(51) Int. Cl.
*G06F 7/00* (2006.01)
(52) U.S. Cl. .................................. 700/213; 700/226
(58) Field of Classification Search .................. 700/213, 700/226; 705/5
See application file for complete search history.

(56) References Cited

U.S. PATENT DOCUMENTS

| | | |
|---|---|---|
| 4,711,994 A | 12/1987 | Greenberg |
| 4,776,464 A | 10/1988 | Miller et al. ................. 209/3.3 |
| 4,984,156 A | 1/1991 | Mekata ........................ 705/5 |
| 5,051,565 A | 9/1991 | Wolfram ..................... 235/384 |
| 5,225,990 A | 7/1993 | Bunce et al. |
| 5,401,944 A | 3/1995 | Bravman et al. |
| 5,478,991 A | 12/1995 | Watanabe et al. ........... 235/375 |
| 5,793,639 A | 8/1998 | Yamazaki |
| 5,866,888 A | 2/1999 | Bravman et al. ............ 235/375 |
| 5,914,671 A | 6/1999 | Tuttle |
| 5,920,053 A | 7/1999 | DeBrouse ................... 235/375 |

(Continued)

OTHER PUBLICATIONS

Kauvar et al., Airport Security from the Bottom Up, Aug. 2, 2001, p. 1-3, <http://www.rand.org/publications/randreview/issues/rr.08.02/airport.html> (visited Nov. 4, 2002).

(Continued)

*Primary Examiner*—Gene O. Crawford
*Assistant Examiner*—Ramya G Prakasam
(74) *Attorney, Agent, or Firm*—Espinosa I Trueba, PL; William R. Trueba, Jr,; Michael E. Tschupp

(57) ABSTRACT

In a communications network, such as the Internet system and method for arranging the transportation of baggage for airline passengers. Flight information and baggage information from a user is received via the communications network. Typically this is accomplished via a combination of information capture from an online travel provider (e.g., airline) and user input at a Web page. The baggage to be transported is identified and transported from an origin airport to a destination airport. The baggage is delivered to the user specified destination location. The method may further comprise collecting the baggage from an origin location other than the origin airport (e.g., residence, office, hotel, etc.). Travelers may access updated information concerning the location of their baggage from a desktop or laptop computer, a hand-held communication device, a cellular telephone with Internet access, or other suitable communications device.

1 Claim, 13 Drawing Sheets

U.S. PATENT DOCUMENTS

| | | | |
|---|---|---|---|
| 5,949,880 | A | 9/1999 | Curry et al. |
| 6,002,344 | A | 12/1999 | Bandy et al. |
| 6,003,009 | A | 12/1999 | Nishimura |
| 6,006,251 | A | 12/1999 | Toyouchi et al. |
| 6,014,628 | A | 1/2000 | Kovarik, Jr. |
| 6,036,348 | A | 3/2000 | Miura |
| 6,044,353 | A | 3/2000 | Pugliese, III |
| 6,108,636 | A | 8/2000 | Yap et al. |
| 6,158,658 | A | 12/2000 | Barclay .................. 235/384 |
| 6,512,964 | B1 | 1/2003 | Quackenbush et al. ...... 700/226 |
| 6,594,547 | B2 | 7/2003 | Manabe et al. ............. 700/227 |
| 2003/0120510 | A1 | 6/2003 | Panek |
| 2004/0111279 | A1 | 6/2004 | Schoen et al. |
| 2004/0151573 | A1 | 8/2004 | Estes |
| 2004/0162755 | A1 | 8/2004 | Muller |
| 2004/0199403 | A1 | 10/2004 | Ananda |
| 2005/0051622 | A1 | 3/2005 | Mak |
| 2005/0065834 | A1 | 3/2005 | Hale et al. |
| 2005/0258230 | A1* | 11/2005 | Wiater ........................ 235/375 |
| 2005/0258231 | A1* | 11/2005 | Wiater ........................ 235/375 |

OTHER PUBLICATIONS

Butler et al., Rethinking Checked-Baggage Screening0, Jul. 2002, p. 1-3, <http://www.rppi.org/baggagescreening.html> (visited Nov. 4, 2002).

Purnel, et al., Design and Development Airport Security Systems and Related Applications, Apr. 24, 2001, p. 1-4.

Off-Line Baggage Processing, Dec. 9, 2002.

Robert W. Poole, Jr., Aviation Security Newsletter, Issue No. 2, Mar. 2003.

Airports Address Terminal Congestion With Remote Check-In, Aug. 24, 2001.

Velotta, Richard N., CAPS outlines growth plans at conference, Las Vegas Sun, Jun. 27, 2001.

Jones, Chris, Remote Baggage Checks Coming to Airport, Las Vegas Tribune, Apr. 1, 2005.

Information about Certified Airline Passenger Services, LLC, Jul. 22, 2005.

PR Newsire, "America West Offers Baggage Check-In Service At Imperial Palace", Jun. 21, 1999.

Business Wire, "National Airlines Introduces National Flight Centers and Adds a Third New York JKF Flight", May 6, 1999.

Gould, Lark Ellen, "Raising the Stakes", Travel Agent, No. 10, vol. 294, p. 100, Apr. 12, 1999.

"News, Tips & Bargains; A Seamless Takeoff—From Your Room", Los Angeles Times, Part L, p. 3, Sunday Home Edition, Oct. 10, 1999.

"Certified Airline Passenger Services—CAPS—of Las Vegas Selects Unisys to Move Check-In Out of the Airport", Business Wire, Inc., Jun. 28, 2000.

"Certified Airline Passenger Services", facsimile Oct. 16, 2003.

Scope of Services for Off-Line Baggage Processing, Florida Department of Transportation, Dec. 9, 2002.

Velotta, Richard N. "CAPS outlines growth plans at conference", Las Vegas Sun, printed on Jun. 24, 2001.

McDowell, Edwin, "Lightening the Luggage Load", The New York Times, printed on Aug. 20, 2000.

Velotta, Richard N. "Vegas baggage-handling firm on fast track for growth", Las Vegas Sun, printed on Nov. 22, 2000.

* cited by examiner

ABC AIRLINES

| Home | Travel | Skymiles* | Programs & Services | Inside Customer Care |

John P. Smith
Total miles: 0

Log out

Site map & search

Site help

506

Home > Travel > Reservations

Reservations

TRIP PLANNER : step 1: step 2: step 3: step 4

Available flights

To select the itinerary that best matches your travel plans, click in the Select Itinerary column of your itinerary choice. Then click the CONTINUE button at the bottom of the page.

Itinerary 1                           Price per passenger: $475.00

| Select itinerary | Carrier flight # | Cabin & class | Departs | | | Arrives | | | |
|---|---|---|---|---|---|---|---|---|---|
| | | | From | Date | Time | To | Date | Time | Stop |
| ○ | 339 | Coach(H) | LGA | 25 Aug 00 | 940A | CVG | 25 Aug 00 | 1154A | 0 |
| | 5869* | Coach(H) | CVG | 25 Aug 00 | 245P | MYR | 25 Aug 00 | 415P | 0 |
| | 4682 | Coach(H) | MYR | 30 Aug 00 | 950A | ATL | 30 Aug 00 | 1106A | 0 |
| | 540 | Coach(H) | ATL | 30 Aug 00 | 1200N | LGA | 30 Aug 00 | 212P | 0 |

Note: The following fare rules apply to this itinerary - Rule 1

Itinerary 2                           Price per passenger: $475.00

| Select itinerary | Carrier flight # | Cabin & class | Departs | | | Arrives | | | |
|---|---|---|---|---|---|---|---|---|---|
| | | | From | Date | Time | To | Date | Time | Stop |
| ○ | 339 | Coach(H) | LGA | 25 Aug 00 | 940A | CVG | 25 Aug 00 | 1154A | 0 |
| | 5869* | Coach(H) | CVG | 25 Aug 00 | 245P | MYR | 25 Aug 00 | 415P | 0 |
| | 4682 | Coach(H) | MYR | 30 Aug 00 | 950A | ATL | 30 Aug 00 | 1106A | 0 |
| | 526 | Coach(H) | ATL | 30 Aug 00 | 1230P | LGA | 30 Aug 00 | 243P | 0 |

Note: The following fare rules apply to this itinerary - Rule 1

Itinerary 3                           Price per passenger: $475.00

| Select itinerary | Carrier flight # | Cabin & class | Departs | | | Arrives | | | |
|---|---|---|---|---|---|---|---|---|---|
| | | | From | Date | Time | To | Date | Time | Stop |
| ○ | 339 | Coach(H) | LGA | 25 Aug 00 | 940A | CVG | 25 Aug 00 | 1154A | 0 |
| | 5869* | Coach(H) | CVG | 25 Aug 00 | 245P | MYR | 25 Aug 00 | 415P | 0 |
| | 4884 | Coach(H) | MYR | 30 Aug 00 | 1140A | ATL | 30 Aug 00 | 1255P | 0 |
| | 446 | Coach(H) | ATL | 30 Aug 00 | 130P | LGA | 30 Aug 00 | 343P | 0 |

Note: The following fare rules apply to this itinerary - Rule 1

ABC AIRLINES

| Home | Travel | Skymiles* | Programs & Services | Inside Customer Care |

John P. Smith
Total miles: 0

Log out

Site map & search

Site help

510

Home > Travel > Reservations

Reservations

TRIP PLANNER : step 1: step 2: step 3: step 4

Passenger information

Prefix:    First/Middle Name:    Last Name:    Suffix:

[Mr. ▼] [John P] [Smith] [▼]

SkyMiles #:    Seat:

[2321838738] [Aisle ▼]

Note: For security reasons, www.delta-air.com does not allow 3rd party purchases. This means the credit card traveling passenger. Please ensure the last name of the first passenger above matches the cardholder's last name and the address used is the address the credit card company has on file. This address will be used for mailing your ticket.

Cardholder details

Prefix:    First/Middle Name:    Last Name:    Suffix:

[Mr. ▼] [John P] [Smith] [▼]

Street address:

[1155 FIFTH AVENUE]

Apt, suite or Floor number:

[APT]   ○   Apt ○   Suite ○   Floor ○   Space

P.O. Box number:    Military, rural routes, university addresses, etc.

[ ]   [ ]

City:    State:   Country:    Postal Code:

[NEW YORK] [NY] [United States ▼] [10036]

Telephone:

[555 1234]

IMPORTANT: If you are departing from the U.S., are traveling in the next 48 hours and your itinerary is not E-ticket eligible, you will be unable to complete your transaction via this Web site.

If you are departing from another country: will only be able to complete your purchase if your chosen itinerary date is outside of 24 hours from today's date, and only then if it is Electronic Ticket eligible. Itineraries not Electronic eligible must be purchased at least 10 days in advance. If you are traveling within the next 10 days, you will be unable to complete your purchase via this Web site.

[◄ START OVER] [CONTINUE ►]

Fig. 5C      512

ABC AIRLINES

| Home | Travel | Skymiles* | Programs & Services | Inside Customer Care |
|---|---|---|---|---|

John P. Smith
Total miles: 0

Log out

Site map & search

Site help

Home > Travel > Reservations

Reservations

TRIP PLANNER : step 1: step 2: step 3: step 4

Confirm and purchase

Please review and confirm your flight itinerary, passenger and billing information. Use the back button on your browser to go back and make any necessary corrections. To finalize your reservations, enter your credit card information and click the Purchase Ticket* button below – then wait for your confirmation number to appear.

Price per passenger: $475.00

| Carrier flight # | Cabin & class | Departs | | | Arrives | | |
|---|---|---|---|---|---|---|---|
| | | From | Date | Time | To | Date | Time |
| 1297 | Coach (H) | New York (La Guardia) (LGA) | 25 Aug 00 | 600A | Cincinnati (CVG) | 25 Aug 00 | 845A |
| 5865* | Coach (H) | Cincinnati (CVG) | 25 Aug 00 | 920A | Myrtle Beach (MYR) | 25 Aug 00 | 1220P |
| 4684* | Coach (H) | Myrtle Beach (MYR) | 30 Aug 00 | 1140A | Atlanta (ATL) | 30 Aug 00 | 115P |
| 1446 | Coach (H) | Atlanta (ATL) | 30 Aug 00 | 130P | New York (La Guardia) (LGA) | 30 Aug 00 | 345P |

Note: The following fare rules apply to this itinerary - Rule 1

516 ~ [Arrange Baggage Pick-up & Delivery ►]    [Choose your ►]

Passenger Information

| Passenger | SkyMiles # | Price |
|---|---|---|
| Mr. John P. Smith | 2321838738 | $475.00 |
| | Total Price: | $475.00 |

Address:
Mr. John Smith
1155 Fifth Avenue
Apt. 26C
New York, NY 10035
United States
Phone: 212 555 1234

Cardholder details

Credit Card:  Number:                             Expires:
[VISA ▼] [1234567898765432]         [Jan ▼] [2002]

[◄ START OVER]   [PURCHASE TICKETS ►]

Fig. 5D    514

TRAVELER INFORMATION          602

CONFIRMATION #: 24810314X
AIRLINE:      DELTA
FLIGHT:       658
ORIGIN:       LGA
DESTINATION:    MYR
FIRST NAME:     JOHN
MIDDLE INITIAL:   P.
LAST NAME:      SMITH
COMPANY NAME: SMITH & JONES, LLP
ADDRESS:        1155 FIFTH AVENUE
CITY, STATE:     N.Y., N.Y.
ZIP CODE:       10035
HOME PHONE:    (212) 555-1234
BUSINESS PHONE:    (212) 555-5678
FORM OF PAYMENT:    VISA

604

BAGGAGE INFORMATION

PICK-UP LOCATION ADDRESS:

DELIVERY LOCATION ADDRESS:

CONTACT NAME:

DELIVERY TYPE (BUSINESS, HOTEL/MOTEL, RESIDENCE):    606

QUANTITY OF BAGS:

PRIORITY (ASAP, WITHIN 2 HRS, WITHIN SAME DAY):

BAGGAGE CHECKED ALREADY? (Y/N):

[ ENTER ]

Fig. 6A

TRAVELER INFORMATION  602

CONFIRMATION #: 24810314X
AIRLINE: DELTA
FLIGHT: 658
ORIGIN: LGA
DESTINATION: MYR
FIRST NAME: JOHN
MIDDLE INITIAL: P.
LAST NAME: SMITH
COMPANY NAME: SMITH & JONES, LLP
ADDRESS: 1155 FIFTH AVENUE
CITY, STATE: N.Y., N.Y.
ZIP CODE: 10035
HOME PHONE: (212) 555-1234
BUSINESS PHONE: (212) 555-5678
FORM OF PAYMENT: VISA

BAGGAGE INFORMATION

PICK-UP LOCATION ADDRESS: 1155 FIFTH AVENUE, APT. 26D

DELIVERY LOCATION ADDRESS: RADISON HOTEL, 125 OCEAN DRIVE, MYRTLE BEACH, S.C.

CONTACT NAME: JOHN SMITH

DELIVERY TYPE (BUSINESS, HOTEL/MOTEL, RESIDENCE): HOTEL

QUANTITY OF BAGS: 2

PRIORITY (ASAP, WITHIN 2 HRS, WITHIN SAME DAY): ASAP

BAGGAGE CHECKED ALREADY? (Y/N): N

608

[ ENTER ]

Fig. 6B

BAGGAGE STATUS INQUIRY

802 ⟋ CONFIRMATION #: 24810314X

PASSENGER NAME: JOHN P. SMITH

DELIVERY ADDRESS: 125 OCEAN DR., MYRTLE BEACH, S.C.

804 ⟋ STATUS:   DELIVERED 4:52 p.m. EST

RETURN TO HOME

Fig. 8

BAGGAGE TRANSPORTATION SECURITY SYSTEM AND METHOD

CROSS REFERENCE TO RELATED APPLICATIONS

This application is a continuation-in-part of U.S. patent application Ser. No. 09/665,938, filed Sep. 20, 2000, now U.S. Pat. No. 6,512,964 entitled Baggage Transportation System and Method, hereby incorporated by reference herein in its entirety and for each of its teachings and embodiments.

FIELD OF THE INVENTION

The present invention relates to the field of baggage handling and security. More particularly, the present invention relates to a system and method for arranging baggage pick-up from a traveler-specified first location and delivery to a traveler-specified second location, and the tracking and screening of such bags for security purposes.

BACKGROUND OF THE INVENTION

Transporting baggage to and from the home or office to the airport is frequently one of the most cumbersome aspects of airline travel for business and pleasure travelers alike. Moreover, airline passengers carrying more than one small piece of luggage to the airport are often forced to wait in long lines to manually check their luggage with airline personnel. Typically, at check-in, an airline employee inputs the passenger's name or ticket number and the number of bags traveling with the passenger into a computer terminal. Tags are then generated and affixed to the baggage, which is then placed on a conveyor. Due to the time constraints associated with airline travel, this delay often forces passengers to hurry through the airport to board their flights on time, adding to an already stressful travel experience.

The inconvenience associated with checking baggage continues even after passengers disembark an aircraft in their destination city. Travelers must typically wait at baggage carousels for their baggage to appear, while the line outside of the airport for ground transportation steadily grows. Those unlucky passengers whose bags are unloaded last from the aircraft will unfortunately spend additional time waiting in line for ground transportation. In addition, airline delays and/or unavoidable scheduling may often force business travelers to carry their baggage directly from the airport to a business meeting because they do not have sufficient time to check in at their hotel.

The prior art includes baggage handling systems that are limited to intra-airport (or intra-terminal) baggage handling. For example, U.S. Pat. No. 5,793,639 to Yamazaki is directed to an intra-airport baggage receiving and handling method and system, with particular emphasis on the security aspects of baggage handling. Other prior art shipping services ship packages (e.g., a set of golf clubs) as freight separate from the passenger (i.e., the packages or baggage are not transported as checked baggage on a commercial airline flight with their passenger owner). Airlines will also typically deliver baggage to the home of a passenger when that baggage was temporarily lost or delayed during travel. None of these prior art systems, however, eliminates the need for travelers to carry their bags to the airport, wait in line to check their bags at the counter with airline personnel, with a skycap, or at an airport kiosk, retrieve their bags from an airport carousel, and carry their bags to a destination location.

While passenger convenience remains an important priority for air travel providers, the events of Sep. 11, 2001 have also raised public awareness of security issues surrounding air travel. Making our airways safe has become a priority of both the air travel industry and our federal government. One focus of this wide-ranging security effort has been on baggage screening and efforts to ensure that checked bags do not contain explosive devices. To this end, Congress has mandated that by Dec. 31, 2002, 100% of checked baggage at all United States airports must be electronically screened for explosives.

Critics of this mandate maintain that it will be impossible to achieve 100% baggage screening with currently-existing explosive detection system (EDS) facilities due to high false-positive screening rates and low throughput capability. They also suggest that the cost for installing a sufficient number of EDS machines to satisfy the mandate would exceed current budget estimates. They therefore recommend that Congress relax the mandate and push the deadline for 100% baggage screening to 2004. This would allow time to procure and install additional EDS machines and to realize improvements in EDS technology. Such a delay in implementing the mandate, however, will obviously adversely affect air travel security.

SUMMARY OF THE INVENTION

A system and method for arranging the transportation of baggage for airline passengers from an origin location (e.g., home, office, etc.) to a destination location (e.g., hotel, convention center) and to enable passengers to monitor and verify the status of their baggage transportation via a computer or handheld communications device (cell phone, PDA, etc.) is disclosed. The disclosed system and method significantly alleviate the inconvenience associated with airline travel while providing enhanced security.

In a preferred embodiment, flight information and baggage information from a user is received via a communications network such as the Internet. This may be accomplished by providing a link from an online travel provider Web site (e.g., an airline) to a baggage delivery Web site. In one preferred embodiment, information entered by a user during the purchase of an airline ticket is automatically captured by the baggage delivery Web site. Additional information relating to baggage delivery may be input directly by a user at the baggage delivery Web site.

The baggage to be transported is identified and transported from an origin airport to a destination airport. The baggage is delivered to the user specified destination location. The method may further comprise collecting the baggage from an origin location other than the origin airport. Information concerning the location of the baggage may be provided to a user via the communications network.

In a preferred embodiment, the present system and method also provide improved air-travel security in a number of ways. For example, the present system and method may significantly increase the number of checked bags screened for explosive devices without requiring an increase in the number of EDS machines or improvements in screening technology. In a preferred embodiment, this is accomplished by collecting bags in advance of flight time and screening them during off-peak periods at a secure location outside of an airport's departure terminal. As noted, this significantly increases the number of bags that may be examined, and facilitates compliance with the Congressional mandate of 100% screening of checked bags.

BRIEF DESCRIPTION OF THE DRAWINGS

The present invention will be understood and appreciated more fully from the following detailed description, taken in conjunction with the drawings in which:

FIG. 5B is another sample web page from an airline web site displaying available flights for a selected itinerary;

FIG. 5C is still another sample web page from an airline web site displaying traveler information;

FIG. 5D is another web page from an airline web site with a link to allow users to arrange baggage pick and/or delivery;

FIG. 6A is a sample web page illustrating the input and/or capture of flight information from a passenger;

FIG. 6B is a sample web page illustrating the input of baggage pick-up and/or delivery information;

FIG. 8 is a sample web page displaying baggage status information to an inquiring user.

DETAILED DESCRIPTION OF THE PREFERRED EMBODIMENTS

Figure 1:
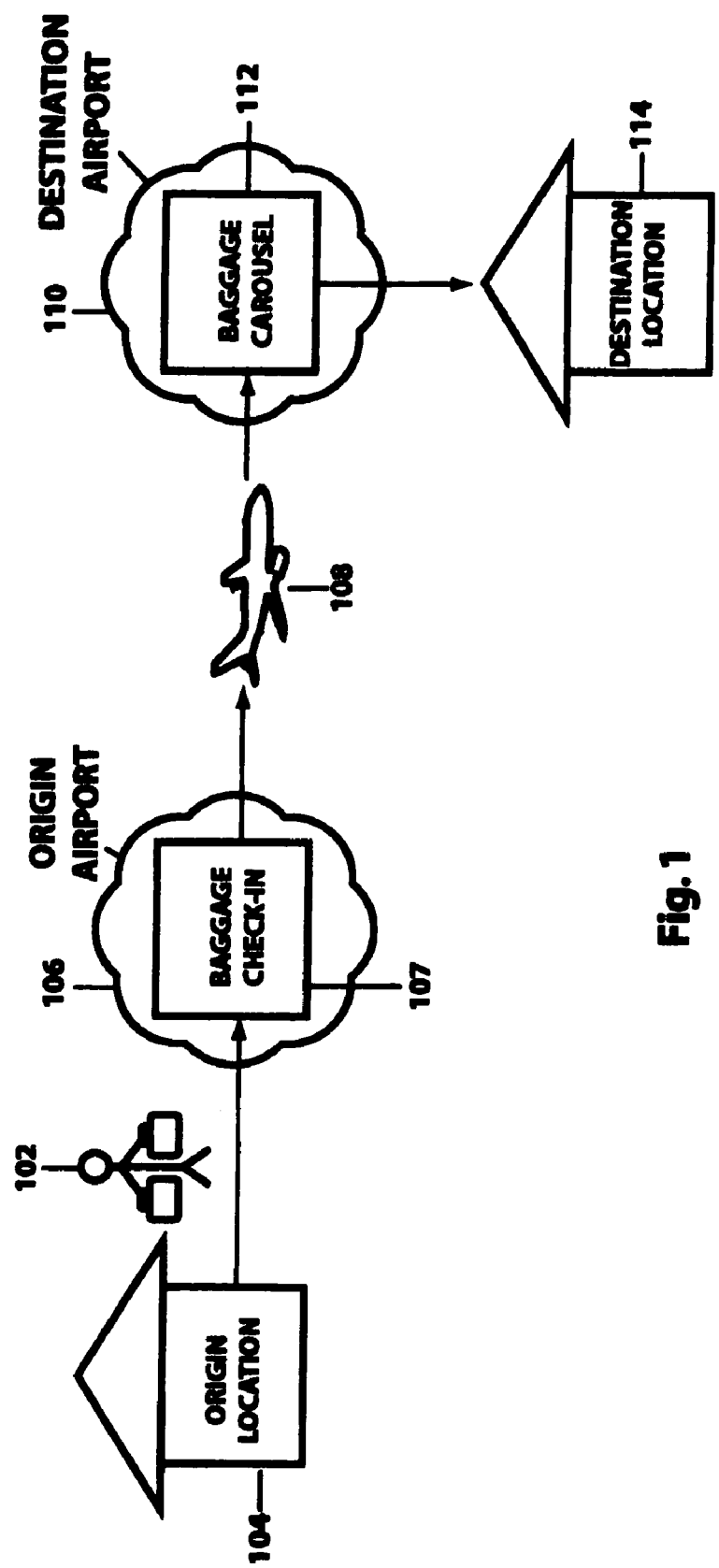
FIG. 1 is a block diagram illustrating the transportation of passenger baggage in the prior art.

Reference is now made to FIG. 1, which is a block diagram illustrating the transportation of passenger baggage in the prior art. As shown, a passenger 102 must typically carry his or her baggage from an origin location 104 (e.g., home, office, etc.) to an origin airport 106. Once at airport 106, passenger 102 must usually wait in line to check bags at the counter with airline personnel, with a skycap, or at an airport kiosk 107 at the appropriate airline terminal. The length of a passenger's wait depends on current airport conditions. For example, if many flights have been canceled or delayed due to inclement weather, most passengers will be forced to wait in line to re-book their flights for a later time. Passengers arriving at the airport at these times will often have to wait in line for over an hour simply to check their baggage, while those passengers not checking baggage may proceed directly to the departure gate without waiting in line. After passengers and their checked baggage are successfully loaded onto a plane 108 and flown to a destination airport 110, passenger 102 must again wait at a baggage carousel 112 at the arrival terminal to claim his or her checked baggage. Passenger 102 must then transport his or her baggage via some form of ground transportation to their next location (e.g., office, conference center, etc.), which may or may not be their final destination location 114 (e.g., hotel, residence, etc.).

Figure 2:
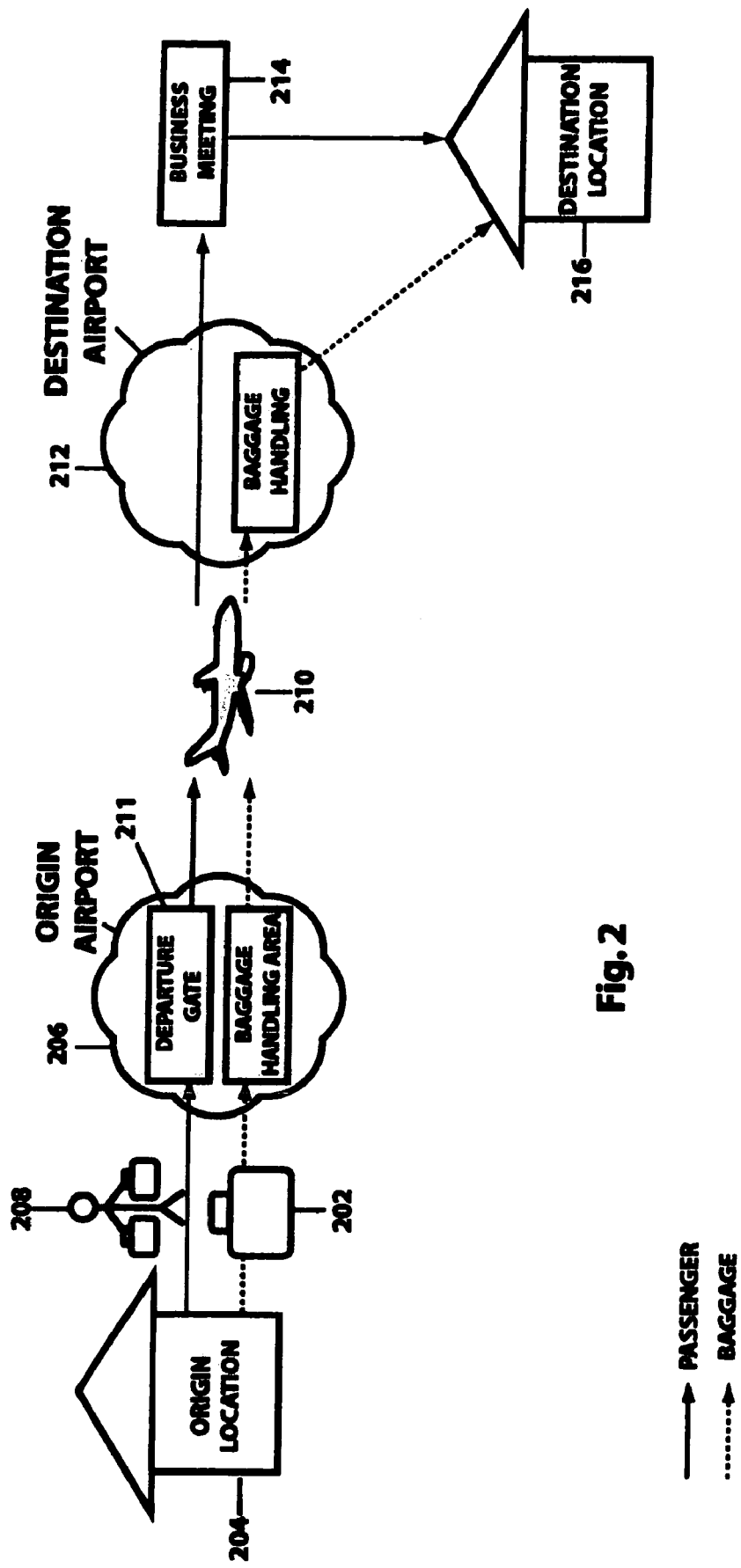
FIG. 2 is a block diagram illustrating the transportation of baggage according to the present invention.

Reference is now made to FIG. 2, which is a block diagram illustrating the transportation of passenger baggage according to the present invention. Baggage 202 is picked up by a Ground Delivery Operator (GDO) from an origin location 204. The origin location may preferably be any location specified by the passenger such as the passenger's home, place of business, or hotel. The baggage may be checked by the GDO at the origin location 204, or transported and checked on behalf of its owner at origin airport 206. In a preferred embodiment, the GDOs act as agents on behalf of the airline. In a preferred embodiment, system rules may establish that an origin location must be within some specified radius (e.g., 50 miles) of the origin airport and that baggage must be picked up by a GDO within some specified time window prior to the passenger's scheduled departure time.

Upon pick-up, the GDO preferably confirms that the passenger possesses proof of ticket purchase and valid photo ID. In a preferred embodiment, the passenger's identity may alternatively or additionally be biometrically confirmed. The GDO also preferably screens all passengers with standard security questions and provides the results back to the passenger's airline or other appropriate security office.

The GDO then tags the baggage with a scanable tag and logs it into a trackable computer database using a portable tag-generating and scanning device. The tag-generating and scanning device may be integrated with or coupled to a laptop or other computing device. The tags are preferably scanned each time custody of the bag is transferred from one entity (e.g. a GDO) to another (e.g., an airport screening facility) thus facilitating tracking of baggage location in a database, as described below. Moreover, each bag may be tagged with a radio frequency identification (RFID) tag to further facilitate bag tracking.

Typically, a confirmation number or other baggage identifier is provided to the baggage owner when baggage delivery is initially booked (e.g., via telephone or the baggage delivery Web site 310 in FIG. 3) to allow for real-time tracking of baggage, as described below. Moreover, baggage claim tickets (which may include this confirmation number) are preferably printed and scanned in the passenger's presence to evidence receipt of the passenger's bags.

Baggage 202 is preferably transported by the GDO to a secure screening facility that complies with all state Department of Transportation (DOT), airport, Transportation Security Administration (TSA), and airport carrier security programs. At the facility, the bags are screened by TSA-approved personnel, securely stored until flight time approaches, and then entered into the airport's baggage-sortation system for delivery to the appropriate flight.

In one preferred embodiment, the secure screening facility may be located on airport grounds but away from the airport's passenger terminals. Alternatively, the secure screening facility may be located off-site from the airport altogether. These embodiments reduce the demands on premium terminal and/or airport space, thus decreasing the costs associated with baggage screening. They also enhance security by removing the baggage screening process from the noise and confusion often found in passenger terminals. Where a separate screening facility is not practical or desired for economic or other reasons, baggage 202 may alternatively be screened using screening facilities located at the passenger's departure terminal.

Congress has recently adopted a 100% baggage screening mandate to improve air-travel security. In a preferred embodiment, the present system and method provide a mechanism for increasing the number of screened bags and facilitating this mandated goal while increasing baggage-screening efficiency and decreasing costs. This preferred embodiment is described in connection with FIG. 9.

Figure 9:
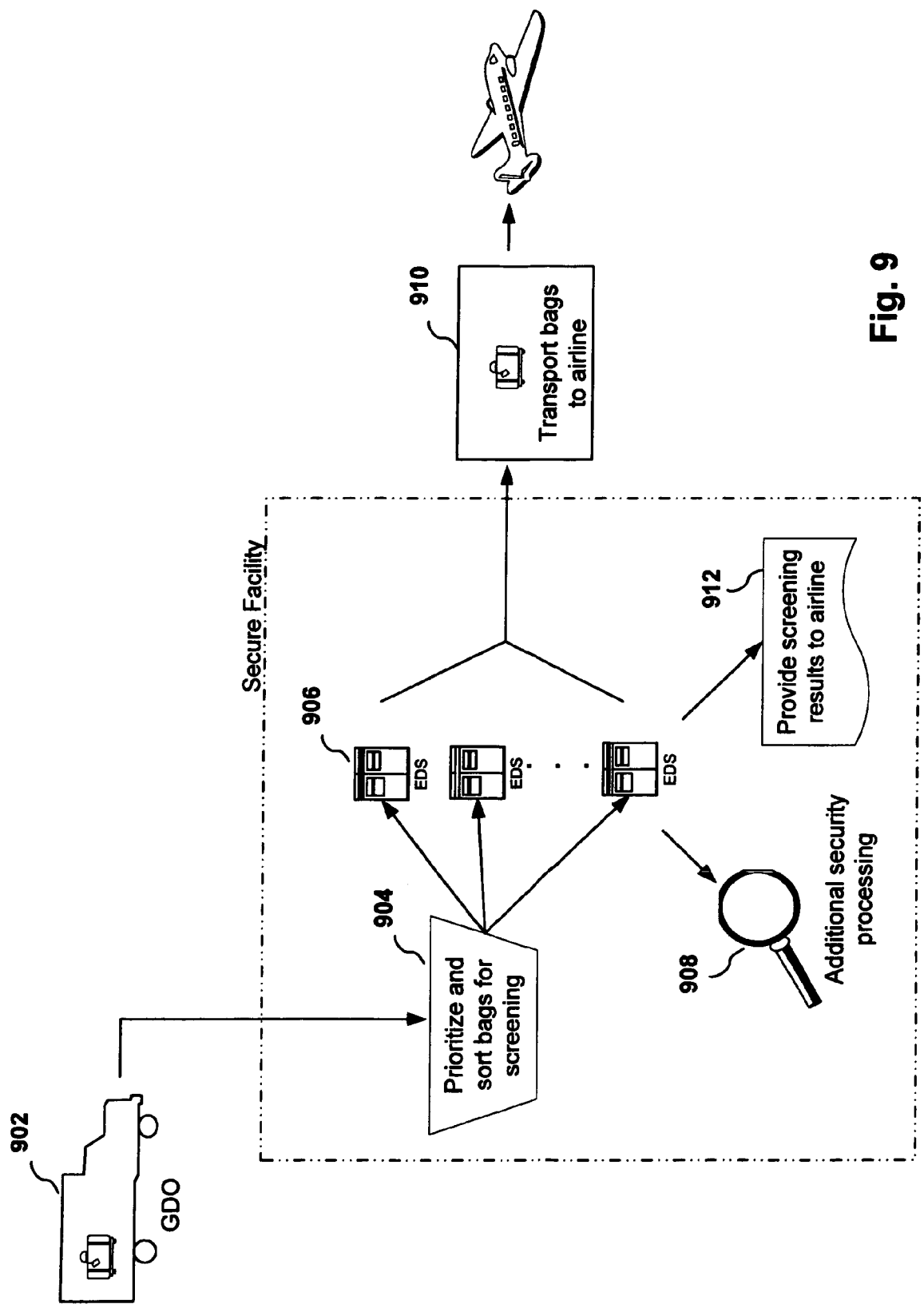
FIG. 9 is a flow diagram illustrating aspects of a preferred embodiment of the present invention.

As shown in FIG. 9, in step 902, baggage is delivered by GDOs to the secure screening facility. In step 904, received bags are prioritized and sorted based on the time remaining until their respective flights are scheduled to depart. If desired, the prioritization and sorting algorithms may also take into consideration other factors such as bag size, destination location, or other screening- or security-related factors. In a preferred embodiment, baggage may be separated into three priority classes: cold, warm, and hot, depending upon the amount of time remaining until departure time. Bags specified as cold or warm are preferably held in a secure environment until they are screened.

In step 906, the sorted bags are processed in parallel by as many explosive detection system (EDS) machines as are available at the screening facility. The bags may additionally or alternatively be examined by one or more other appropriate security machines and/or personnel. In step 908, bags that do not pass screening are flagged for further security processing (e.g., bomb-squad analysis). Police or other homeland-security authorities may also be contacted and/or the bag owner informed, if appropriate. For example, there may be ample time to contact the passenger and arrange for her to be present during a physical search of the bag well in advance of flight time. Moreover, since the system preferably maintains a record of each person who has handled the baggage (which may include biometric information), baggage security is enhanced. Otherwise, in step 910, approved bags are interlined to the appropriate airline for loading on the passenger's flight. Alternatively, bags cleared by the screening system may be fed directly into the airport's baggage sortation system. In step 912, screening results are provided to the airline security checkpoint.

The bag scanning method described above provides several benefits. First, as noted, it improves security and decreases costs because it is performed off-site from the passenger terminal. Second, proper prioritization and sorting of bags delivered by GDOs allows continuous bag screening by the facility's EDS machines during both peak and off-peak travel hours. This reduces the total number of EDS machines required for baggage screening and associated operating costs by increasing utilization of each machine. Third, because baggage 202 is delivered to the screening facility in advance of the passenger's scheduled flight time, the system is better able to cope with any delays that may arise in the screening process such as malfunctioning machines or suspicious baggage.

In a preferred embodiment, the present system and method may comprise a database that tracks the location and integrity of each checked piece of baggage at all times. To facilitate the accuracy of information in this database, the present system and method may employ a wireless global positioning system (GPS) to track ground and/or air transportation vehicles over terrestrial and satellite networks. Baggage tracking may be further facilitated by supplementing information in the database with information from major airlines' reservation and departure control systems. In a preferred embodiment, a common language may be defined to simplify and standardize data communications between these multiple systems. In this way, an operational database with system-wide situational awareness and details of baggage 202 may be maintained and monitored.

In a preferred embodiment, information transmitted from airline computer systems to the baggage tracking database includes any itinerary changes due to flight changes or cancellations, or changes in an individual passenger's travel plans. This information is used to update the baggage tracking database to ensure that the baggage is routed and delivered properly with minimum delay.

As noted, screened bags are preferably transported to the passenger's airline for loading on the passenger's flight. Thus, the owner of the bags, passenger 208, need not carry his or her baggage to the airport or wait in line at check-in. Instead, passenger 208 may proceed directly to the departure gate 211. Baggage 202 is loaded on the plane 210 with passenger 208 and flown to the destination airport 212. Moreover, upon arrival, passenger 208 is preferably free to leave the airport immediately and proceed to a business meeting, hotel, or other appointment/location 214. Passenger 208 need not pick up baggage 202 at a baggage carousel because the baggage is delivered directly to the passenger's designated destination location 216 (e.g., hotel, residence, etc.).

Figure 3:
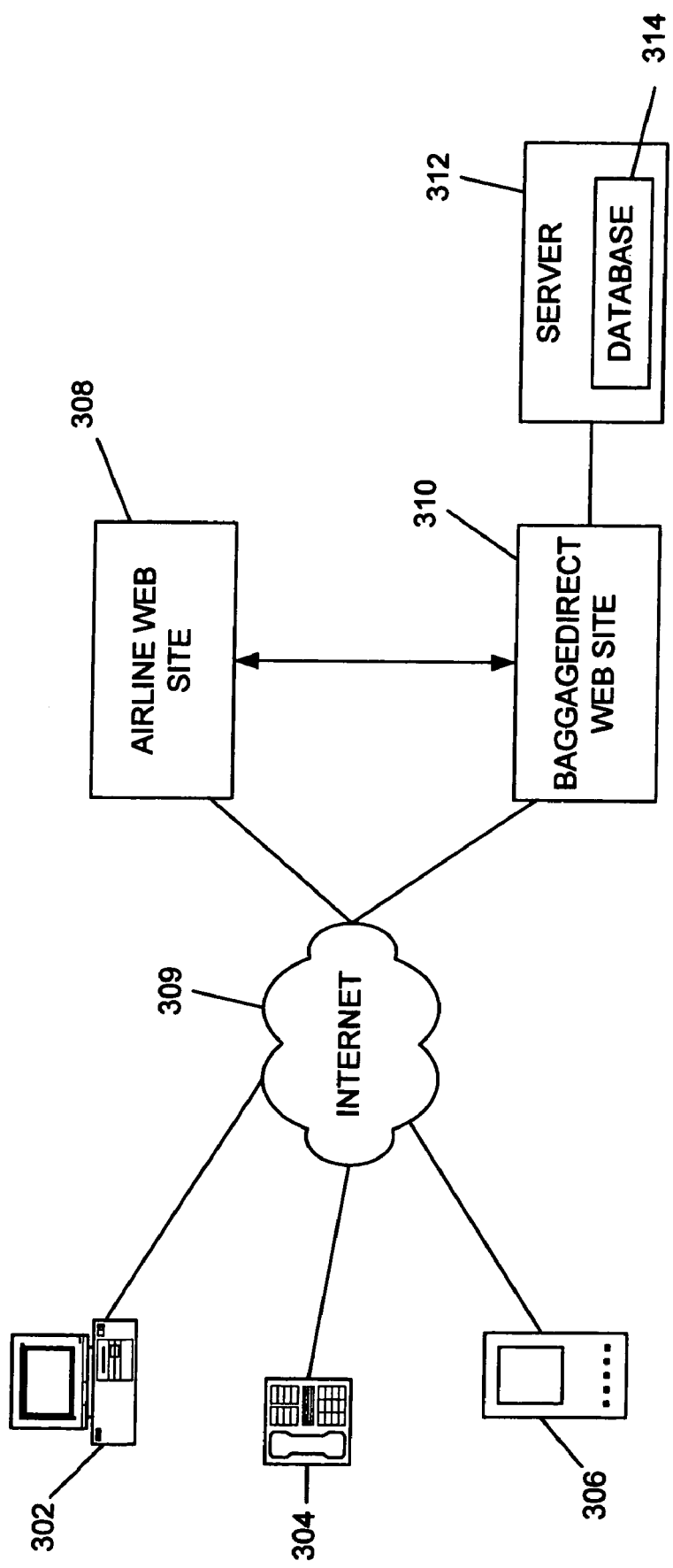
FIG. 3 is a block diagram of a preferred embodiment of a system of the present invention.

Reference is now made to FIG. 3 which is a block diagram of a system of the present invention. As shown in FIG. 3, users communicating via conventional computers 302 (e.g., desktop PCs, laptops, etc.), land-line telephones 304, or wireless communications devices 306 (e.g., cellular telephone, Palm VII™, etc.) may access a travel Web site, such as airline Web site 308 via a communications network, such as the Internet 309. In a preferred embodiment, while purchasing airline tickets, users are provided the option of arranging for the pick-up and delivery of their personal baggage. As described more fully below, when a user chooses this option, the user links to a second baggage-delivery Web site 310 dedicated to baggage delivery. Typically, Web site 310 is maintained by a server computer 312 having a database 314. Database 314 stores baggage identification information (e.g., baggage claim numbers) in linked relation to a final delivery location specified by the traveler. Alternatively, users can directly access the baggage delivery Web site 310 to make arrangements for the transportation of their baggage. After making baggage transportation arrangements, users can check the status of their baggage (e.g., delivered or not delivered) by accessing Web site 310 via conventional computer 302, conventional telephone 304, or wireless device 306, as described below.

Figure 4:
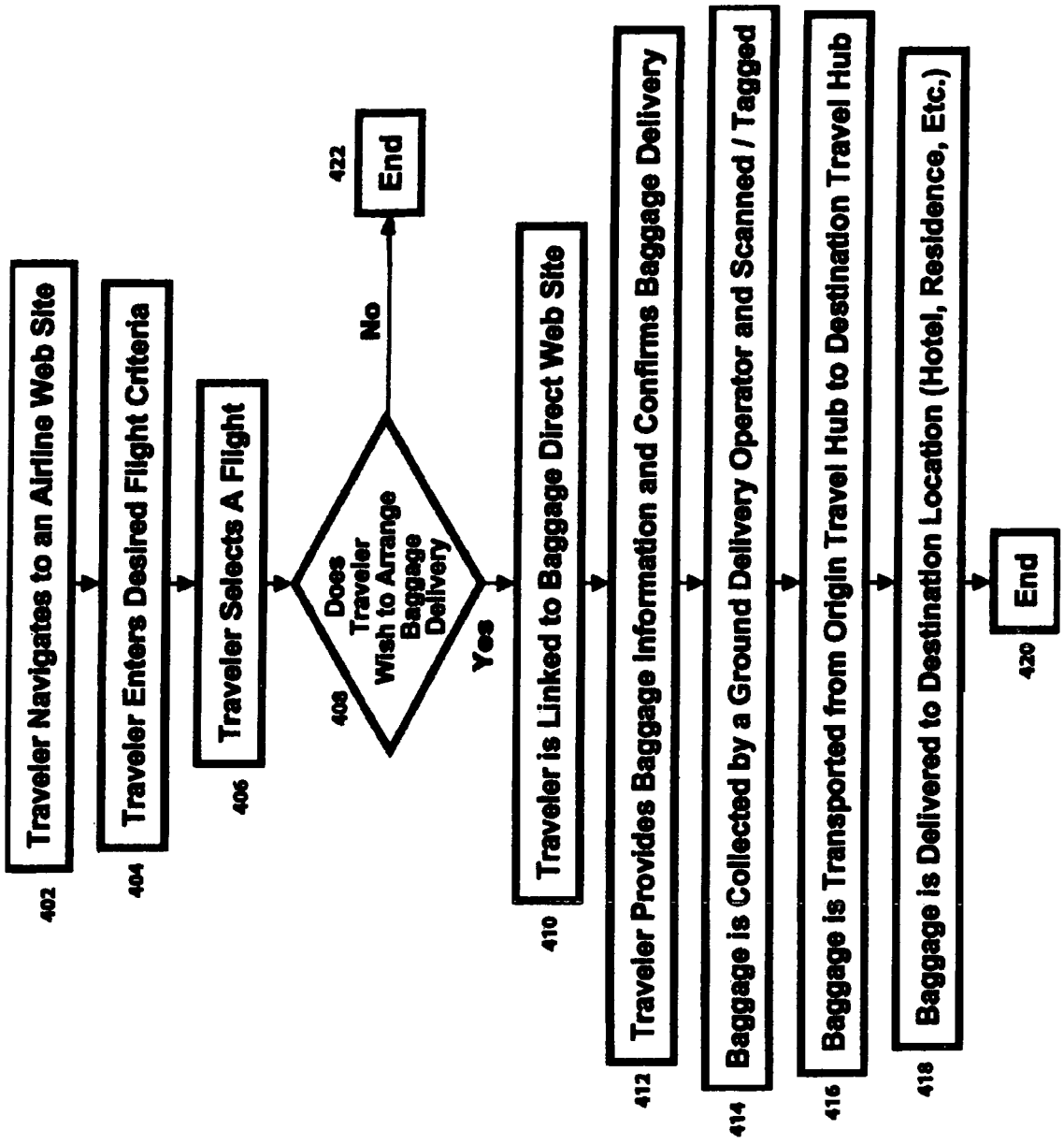
FIG. 4 is a flowchart illustrating the steps in a preferred embodiment of the present invention.
Figure 5A:
FIG. 5A is a sample web page from an airline web site.

Typical operation of the present system and method is further described in connection with FIG. 4. As shown in FIG. 4, in step 402, the traveler navigates to a travel Web site 308, such as the Web site of an airline. An example of a home Web page 502 of a typical airline Web site is shown in FIG. 5A. In step 404, prospective travelers may enter their flight criteria (e.g., travel origin and destination locations and preferred travel dates) into an HTML form 504 on Web page 502. As shown in FIG. 5B, the prospective passenger is then typically provided with a list 506 of available flights meeting the specified criteria at a second Web page 508. In step 406, the passenger then selects a flight from list 506 and, if a reservation can be made for the passenger's desired flight, the Web site then prompts the passenger to enter billing information 510, such as the passenger's name, address, and credit card number, at another Web page 512, as shown in FIG. 5C. At a final confirmation Web page 514, an example of which is shown in FIG. 5D, the passenger confirms the ticket purchase.

In this preferred embodiment, in step 408, if the traveler wishes to make arrangements for baggage pick-up and delivery, the traveler indicates this desire in step 410 by clicking an icon 516 on Web page 514 (see FIG. 5D) to navigate to baggage-delivery Web site 310 (see FIG. 3). In a preferred embodiment, all of the passenger's travel information is forwarded from Web page 512 to Web site 310 via automatic data relay when the passenger clicks icon 516. For example, the server operating Web page 512 may directly transmit a passenger's flight information to baggage-delivery Web site 310 via Electronic Data Interchange (EDI). The transmitted data may be specified in eXtensible Markup Language (XML) or other appropriate format.

In step 410, Web site 310 dynamically creates a Web page including the passenger's travel information and a form to permit the passenger to fill in additional information concerning baggage delivery. An example of how such a Web page might look is shown in FIG. 6A. As shown in FIG. 6A, Web page 602 is automatically filled in with the traveler's name, address, and flight information 604 using the data relayed from airline Web site 308. Web page 602 also includes blank fields 606 to prompt the user to enter the number of bags, the location from which the baggage is to be picked up, and the location to which it is to be delivered. Typically, the traveler schedules and/or reserves a pickup appointment time within a range of acceptable baggage pick-up times. For example, a traveler may wish to have his or her baggage picked-up and processed the evening before an early morning flight.

In step 412, the traveler enters the necessary baggage information and confirms his or her desire to have baggage picked-up and delivered. FIG. 6B is an example of Web page 602 with baggage information 608 filled in by the traveler.

Alternatively or in addition, baggage pickup arrangements may be made without requiring traveler access to the Internet. For example, the system may be adapted to permit travelers to book baggage pickup and delivery via a telephone network. Travelers booking flights by telephone via, e.g., an airline's toll free telephone number, may be asked after finalizing their travel arrangements whether they would like to arrange for baggage pickup and/or delivery. If the traveler responds in the affirmative, he or she may be forwarded to a baggage-pickup telephone operations center.

In step 414, at a time specified by the traveler, the baggage is collected from the origin location by a GDO and tagged using a portable baggage tag generating device. Upon generation of the baggage tag, database 314 is updated and the baggage identifier is stored in linked relation to the final traveler-specified location.

Alternatively, a passenger who carries his or her bags to the airport and checks them in the traditional fashion can make baggage delivery arrangements by accessing an airport kiosk terminal and providing the baggage identifier information (e.g., baggage tag identification numbers) and a destination location. This aspect is especially useful for the business traveler who may have carried his or her bags to the airport but must proceed directly to a business meeting upon arrival at the destination airport and does not wish to carry his or her bags to the meeting. Baggage delivery may also be arranged as part of the usual pre-flight check-in process.

In step 416, after clearing security checks at the off-site screening facility or departure terminal, the baggage is transported from the origin airport to the destination airport. In a preferred embodiment, checked baggage is matched with the passenger upon boarding to ensure 100% positive passenger-baggage matching. If a GDO is delayed in transporting baggage to an airport and the scheduled flight is missed, or if the schedule flight is missed for any other reason such as screening difficulties or other security issues, arrangements for an alternate flight are made. Traveler claims for missing or damaged bags are preferably handled by personnel associated with the entity that operates the baggage pick-up and delivery service. Alternatively, claims for missing or damaged bags may be handled by the GDO. In step 418, the baggage is again collected from the airport by a porter or other personnel associated with the baggage delivery Web site and delivered to the final traveler-specified location. In the event that any problem is encountered during baggage transport and a traveler's baggage is not transported, the traveler is preferably immediately contacted both via telephone and electronic mail, if possible.

Figure 7:
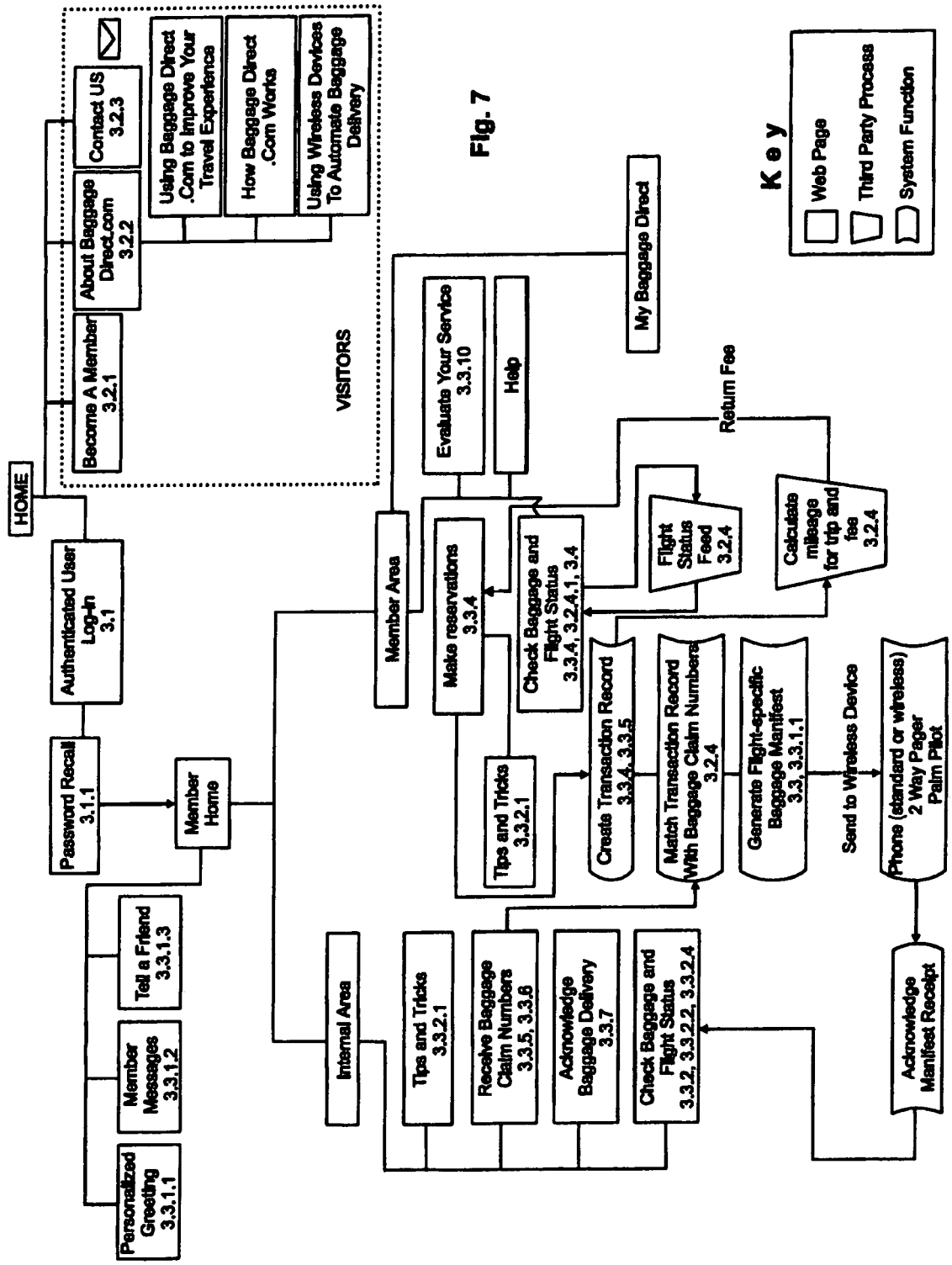
FIG. 7 is a flowchart illustrating the operation of a web site in accordance with a preferred embodiment of the present invention.

The present system and method are further described in connection with FIG. 7. As shown in FIG. 7, when a user accesses the home page of Web site 310, he or she is prompted to enter his or her user login and password at Web page 3.1. If the user has not already registered as a member of the Web site, he or she is prompted to become a new member at Web page 3.2.1. The new member area of the Web site includes Web pages 3.2.2 describing how the baggage delivery system of the present invention operates. After registering as a new member, a user will receive a login name and password to access the site. After logging in, members are greeted at Web page 3.3.1.1 and provided with any member messages at Web page 3.3.1.2 regarding current transactions and/or promotions from the baggage-delivery system. Once within the member area, members can make baggage delivery arrangements and/or check their baggage delivery and flight status.

If a member decides to make baggage delivery arrangements, the member enters the appropriate baggage information (e.g., number of bags, pick-up and destination locations) and a transaction record is created. The mileage and corresponding fee for the locations and number of bags specified by the member are calculated and submitted to the member for approval. As shown, this mileage and fee calculation may be performed by a third party (e.g., airline), but it should be understood that this function could easily be performed by the party maintaining Web site 310. For example, fees may be automatically generated from internal database rule rates established by the entity that maintains the baggage delivery Web site.

If the member wishes to proceed with the baggage delivery transaction, a flight-specific baggage manifest is generated and sent to a GDO. Upon tagging of baggage by a GDO, or, alternatively, checking of the baggage at the airport by a member traveler, the baggage claim numbers are captured in database 314 (see FIG. 3) and matched with the transaction record created earlier. If a member wishes to check flight status, a third party feed of flight status information may be queried and the appropriate information is relayed to the member.

As discussed briefly above, at any time during the baggage transportation process, a passenger may monitor the status of the baggage delivery process by using a computer or other communications device, such as a cellular telephone or PDA (e.g., Palm VII™, Handspring Visor™, etc.). As shown in FIG. 8, to perform such a status inquiry, a user will typically access Web site 310 and enter his or her flight confirmation number 802 and/or other baggage identifier code. After appropriate identity authentication (e.g., entry and confirmation of a user password), baggage delivery status 804 (e.g., delivered, delayed, etc.) is displayed to the user. This aspect is also quite advantageous to the business traveler, since he or she can silently access the Web site via a wireless communications device while at a business meeting to determine if his or her baggage has been successfully delivered to a hotel or residence.

In some preferred embodiments, service providers and other entities such as travel agents, conventions, rental car companies and cruise lines may be provided with an interface to the present system to permit such entities to offer baggage-related services to their customers. Alternatively or in addition, the Web sites of these entities may provide an Internet link to baggage-delivery Web site 310.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

What is claimed is:

1. A method for arranging the transportation of baggage for an airline passenger from an origin location to an origin airport for transport by the airline carrier chosen by the passenger to a destination airport, the method comprising:
   (a) checking in bags with a ground delivery operator;
   (b) obtaining passenger identification information;
   (c) confirming the identity of the passenger;
   (d) collecting passenger airline flight information;
   (e) collecting the baggage from the origin location by said ground delivery operator;
   (f) marking the baggage with an identifier;
   (g) transmitting baggage information via a communications network and associating said baggage information with said airline flight information;
   (h) securely transporting the baggage from the origin location to the origin airport; and
   (i) providing said baggage information and location information associated with said baggage information to the passenger via said communications network.

* * * * *